Dec. 24, 1968 G. HIRMANN 3,417,479
APPARATUS FOR CONTROLLING THE GEOMETRY OF THE
CHASSIS OF MOTOR VEHICLES
Filed May 10, 1965 5 Sheets-Sheet 5

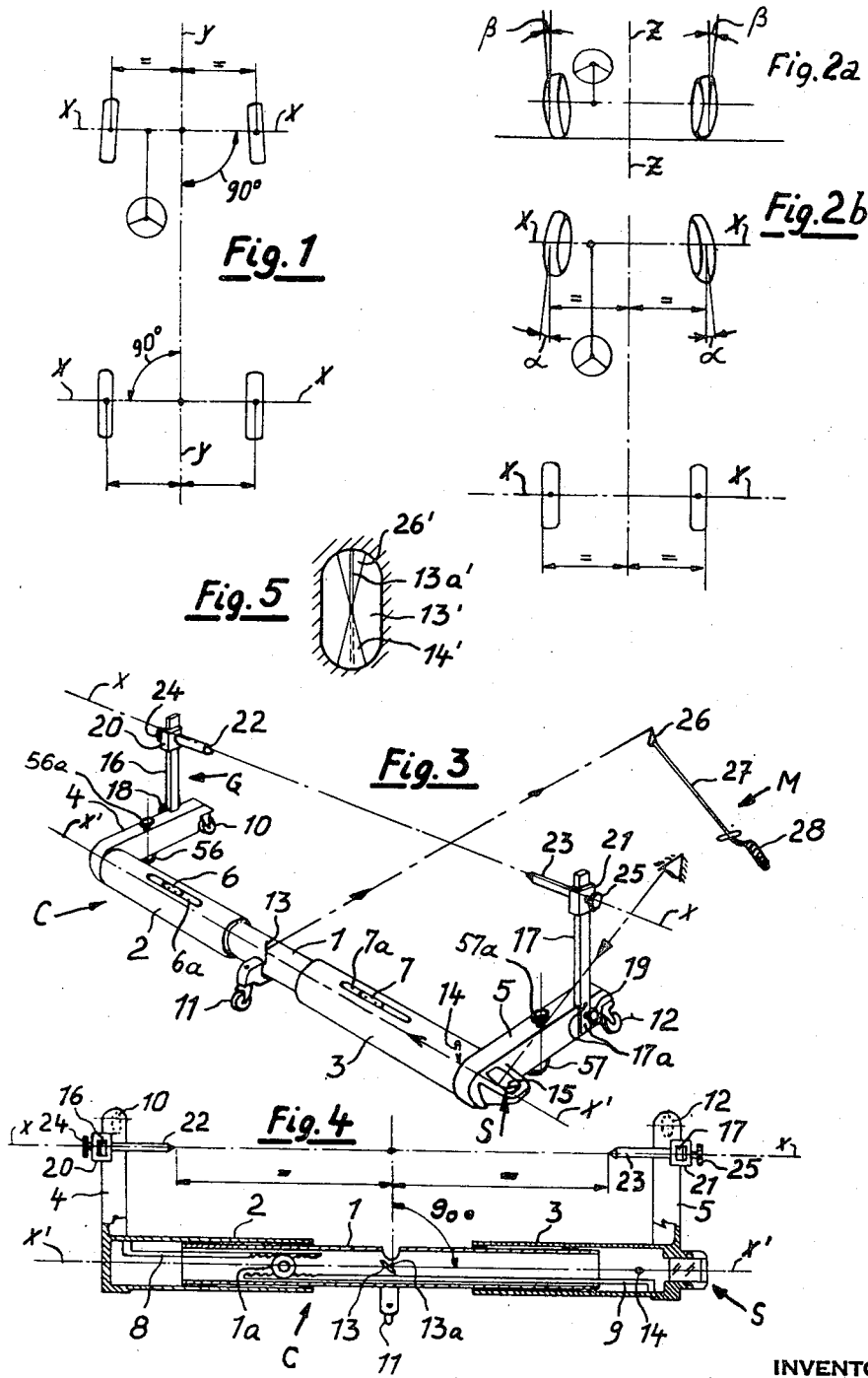

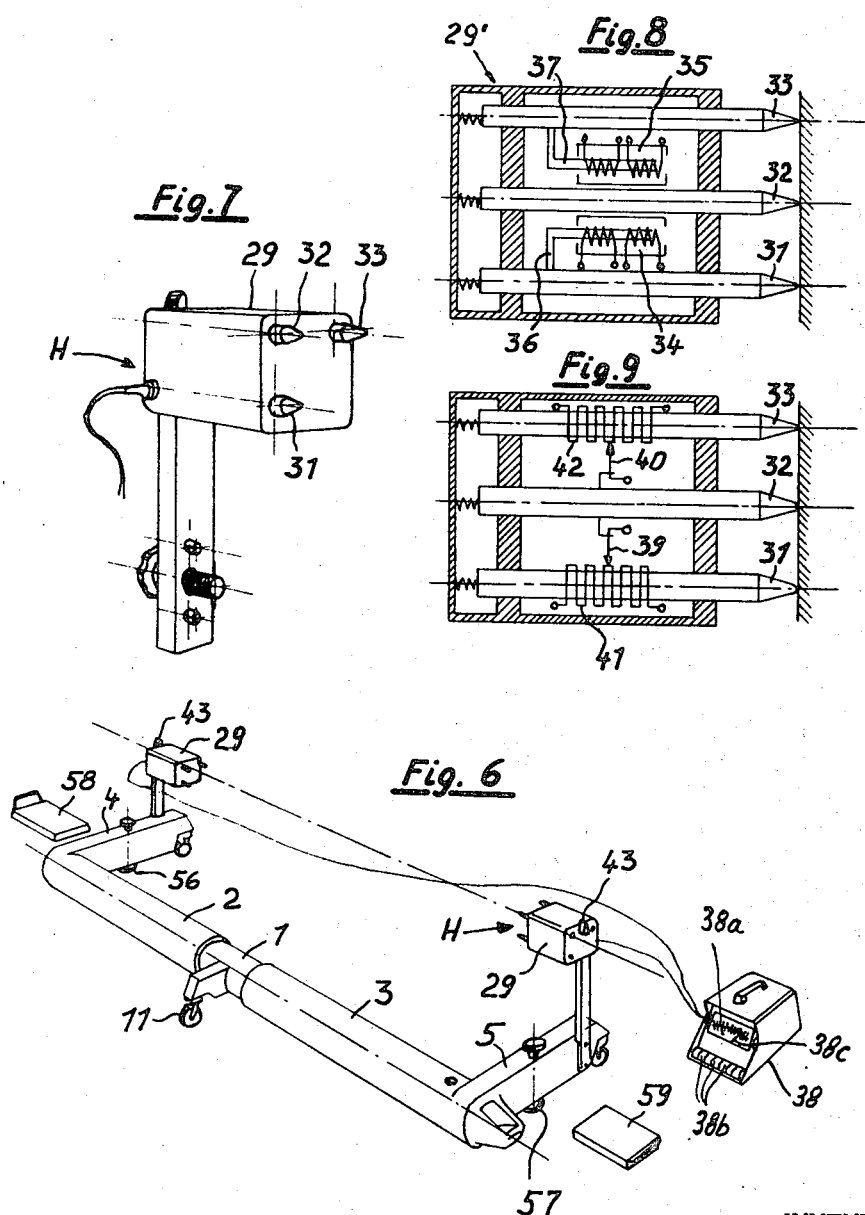

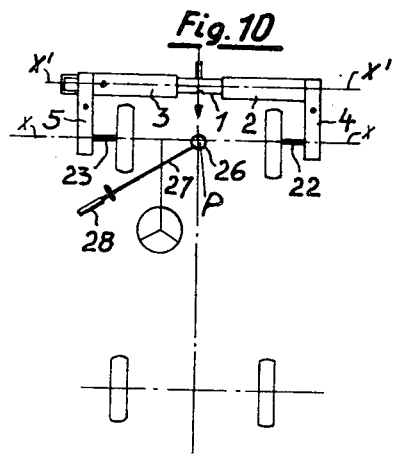
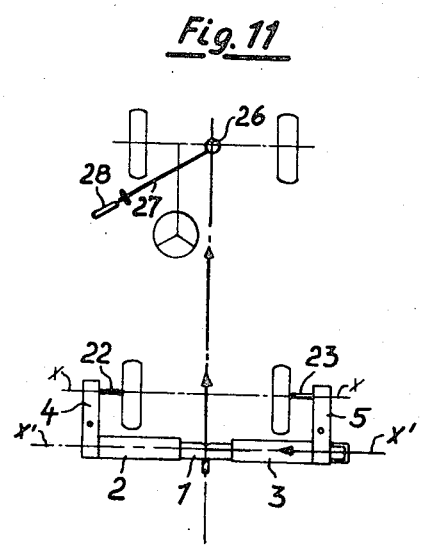
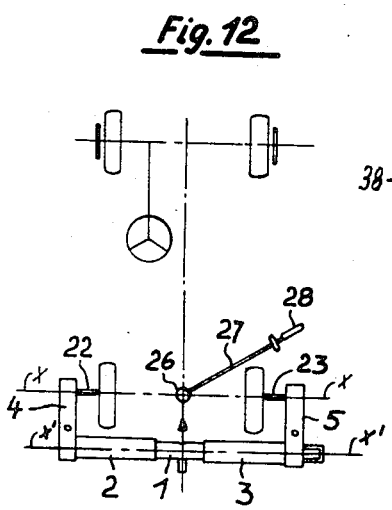
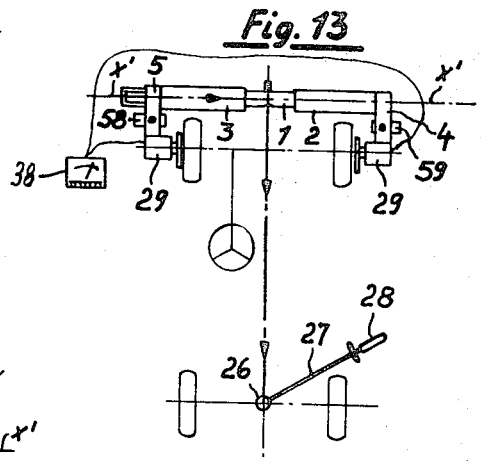
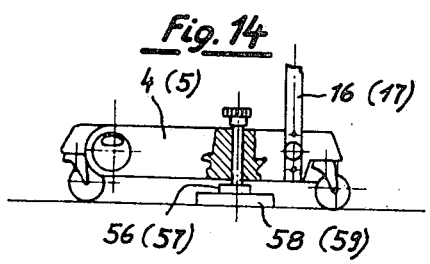

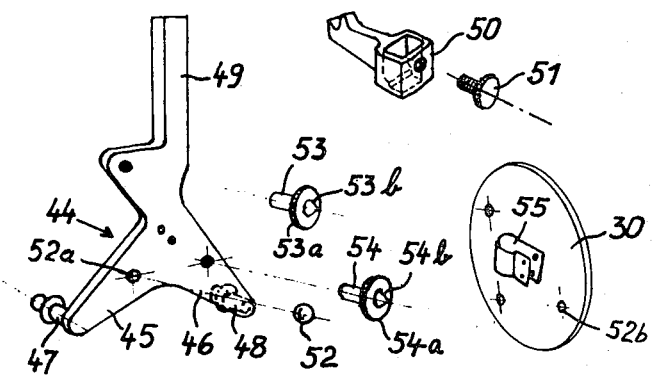
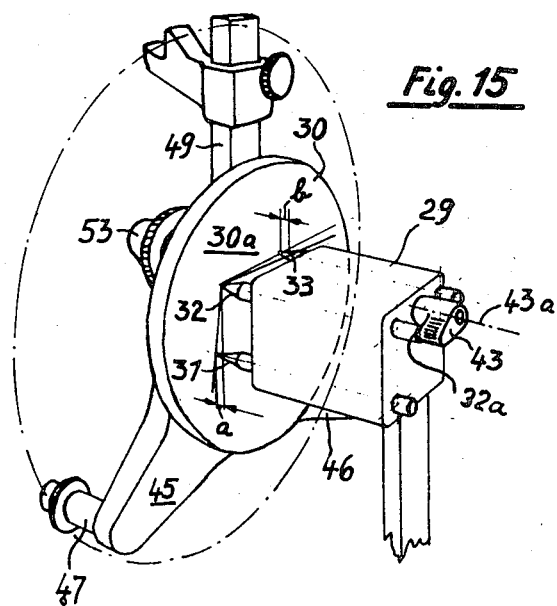

INVENTOR
Georg Hirmann
BY Werner W. Kleeman
His Attorney

United States Patent Office 3,417,479
Patented Dec. 24, 1968

3,417,479
APPARATUS FOR CONTROLLING THE GE-OMETRY OF THE CHASSIS OF MOTOR VEHICLES
Georg Hirmann, Zurich, Switzerland, assignor, by mesne assignments, to Polyprodukte AG., Zurich, Switzerland, a corporation of Switzerland
Filed May 10, 1965, Ser. No. 454,485
Claims priority, application Switzerland, May 13, 1964, 6,221/64; Jan. 5, 1965, 194/65
15 Claims. (Cl. 33—203.17)

ABSTRACT OF THE DISCLOSURE

An apparatus and method for checking the geometry of the chassis of a motor vehicle wherein a central longitudinal axis of symmetry of the chassis is determined and each further measurement of the geometric condition of the chassis such as the geometric axis position at the geometric forward and rear wheel axis and the two-dimensional inclination of the geometric wheel planes are based upon and relative to said determined central axis of chassis symmetry.

---

The present invention has reference to an improved method of and apparatus for checking the geometry of the undercarriage or chassis of motor vehicles.

The continuously increasing number of vehicles, higher speeds and attendant requirements for greater driving safety renders increased control of the so-called undercarriage or chassis geometry practically indispensable. Numerous apparatuses for performing such control or checking operations are already known to the art. With the devices which are cheaper in cost it is necessary to be content with a lesser degree of control precision, limited usability, cumbersome operation or other disadvantages, whereas devices which can be considered practically technically faultless are very expensive, require a great deal of space, usually also require certain changes in construction to enable installation. All of the commercially available devices have one feature in common—to carry out exact control they require an appropriately trained and experienced person.

Accordingly, it is a primary object of the present invention to provide an improved apparatus for controlling or checking the geometry of the chassis of motor vehicles which is relatively simple, economical and uncomplicated in construction, highly precise in operation, and can be used by persons possessing relatively little training and skill.

Further specific objects of the present invention are directed to the provison of improved apparatus of the mentioned type for the control of the undercarriage geometry which overcomes the considered disadvantages of prior art apparatuses and which:

(a) Permits an overall checking of the geometry of the undercarriage or chassis even by persons with little training and experience, in a quick and reliable manner;

(b) Renders it possible to carry out control for every operational vehicle size by virtue of the advantageous selection and design of the physical structure of inventive apparatus;

(c) Provides faultless measurement data with a reasonably priced apparatus;

(d) Considerably cuts down operating time for carrying out the control in comparison with known devices and, thus, makes it possible to carry out the control of the chassis geometry during mass production of motor vehicles, for instance, located upon conveyor bands or belts; and, (e) If necessary, enables complete automatisation of the measuring operation including recording of data and optical or acoustical indication in the event predetermined tolerance values are exceeded, in other words, makes it possible to completely dispense with operating personnel.

In order to implement these and still further objects of the invention, the inventive chassis geometry-control apparatus is characterized by the features that, the control apparatus can be operably connected to the undercarriage or chassis by means of mechanical feelers, these feelers during connection of the apparatus are oppositely positively and synchronously moved with respect to the axis of symmetry of the control apparatus, whereby the geometric characteristics of the apparatus are comparable with the geometric conditions of the chassis, and that each measurement is based upon the optical-mechanical or mechanically determined axis of symmetry of the chassis and thus during each measurement the position of the opposite geometrical vehicle axis is postively taken into consideration.

Important advantages of the invention reside in the fact that: the control apparatus designed according to both exemplary embodiments to be considered hereinafter adjusts itself to the given position of the vehicle, so that there is dispensed with the previously required adjustment of the vehicle; due to the advantageous configuration, guiding and synchronisation of the connecting elements of the apparatus, the geometrically correct central axis of the chassis is used as base value during each measurement; the functional correlation of both geometrical chassis axes which is indispensable for an exact measurement is positively considered during determination of the measuring results.

Hereinafter two physical constructions of inventive control apparatus will be described, the first will be conveniently designated as structural type "A" and is an easily transportable structure used for the selection successive control of the forward and rear axes, whereas the other construction conveniently designated as structural type "B" is basically a stationary apparatus.

A essential difference between both these embodiments resides in that the criterion of controlling each chassis axis in connection with the opposite axis can be fulfilled with structural type "A" by an optical operable connection, whereas for structural type "B" such is fulfilled by a mechanical connection.

Other features, objects and advantages of the invention will become apparent by reference to the following detailed description and drawings in which:

FIGURE 1 schematically illustrates a top plan view of a vehicle and depicts the geometric relationships of the correct axis positions;

FIGURES 2a and 2b schematically illustrate in front view and top plan view, respectively, the geometrical relationship of the two dimensional inclination of the geometric wheel planes;

FIGURE 3 is a perspective view of a first embodiment of inventive control apparatus constructed as a transportable unit and according to structural type "A";

FIGURE 4 is a longitudinal cross-sectional plan view of the control apparatus of FIGURE 3;

FIGURE 5 illustrates the sight picture appearing in the sighting mechanism of the apparatus of FIGURE 3 with faultless geometry of the axis;

FIGURE 6 is a perspective view of the control apparatus of FIGURE 3 with mounted measuring heads;

FIGURE 7 is an enlarged perspective view of one of the measuring heads depicted in FIGURE 6;

FIGURE 8 shows in development the arrangement of the measuring data-indicator for a measuring head which carries out the measurement operation with differential transformers;

FIGURE 9 shows in development the arrangement of the measuring data-indicator for a measuring head which carries out measurements with measuring potentiometers or ohmic-indicators;

Figure 17:
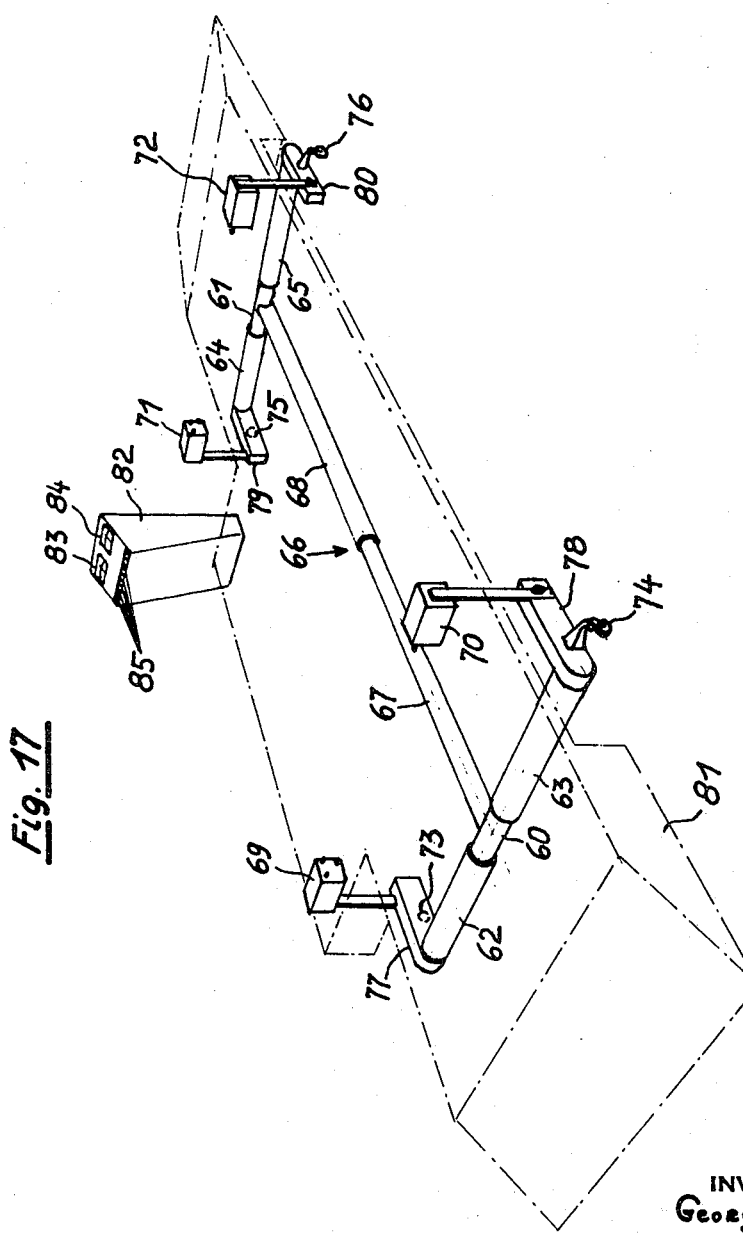

FIGURE 10 schematically illustrates in top plan view the apparatus of FIGURE 3 for checking the rear axis position and shown operably connected with the front axis;

FIGURE 11 is a schematic top plan view of the apparatus of FIGURE 3 for checking the rear axis position and shown operably connected with the rear axis;

FIGURES 12 and 13 are respective plan views showing use of the apparatus of FIGURE 3 for carrying out angular measurements;

FIGURE 14 is a schematic side view depecting details of the apparatus of FIGURE 3;

FIGURE 15 is an enlarged perspective view showing details of a measuring disk or plate with associated clamping mechanism and measuring head;

FIGURE 16 is a perspective view showing the components of the clamping mechanism and measuring disk of FIGURE 15 in unassembled position; and FIGURE 17 is a perspective view of a further embodiment of control apparatus which is stationary and of the structural type designated "B" herein.

The taking of measurements at the undercarriage or chassis can generally be sub-divided into two operational groups, to wit:

(a) Control of the geometric axis position at the geometric forward and rear axes. Under the term geometric forward axis and rear axis or merely forward axis and rear axis, as used herein there is to be clearly understood the respective linear connecting line between the forward wheel centers and rear wheel centers respectively. The proper relationship of the centers of the four wheels is depicted in FIGURE 1;

(b) Control of the two dimensional inclination of the geometric wheel planes for all wheels with respect to the vertical plane Z—Z containing the central axis of the chassis, for which purpose commercially available apparatuses generally are employed (cf. FIGURE 2).

(A) *Structural type "A"—transportable embodiment of inventive control apparatus*

An exemplary embodiment of this type apparatus is depicted in FIGURES 3 to 5. The main components of this apparatus will be more precisely described under the following rubrics:

(1) *The carrier or support device.*—The carrier device C comprises two telescopically sliding tubes 2 and 3 displaceably mounted for movement in lengthwise direction upon a carrier or support tube 1. Each sliding or slidable tube 2 and 3 is rigidly connected with a respective extension arm 4 and 5. By means of wedges 6 and 7 or equivalent expedients both of the sliding tubes 2 and 3, respectively, are non-rotatably guided upon the carrier tube 1. To this end, the wedges 6 and 7 travel in a respective slot-shaped recess or keyway 6a and 7a respectively, provided at both sliding tubes 2 and 3 respectively. Due to the fact that the sliding tube 2 is rigidly connected with a gear rack 8 and the sliding tube 3 with a gear rack 9 and both such gear racks 8, 9 are reciprocably operatively connected with the circumference of a pinion 1a rotatably mounted in carrier tube 1, in each instance both sliding tubes 2 and 3 can only be displayed symmetrically and through equal paths with respect to the center of the carrier tube 1. The entire telescopically constructed carrier device or apparatus C stands on the floor or other support surface by means of three caster rollers 10, 11 and 12.

(2) *The sighting mechanism.*—The sighting mechanism S installed in the inventive apparatus embodies a reflecting square or mirror 13 possessing a vertical marking line 13a at the center of the mirror 13. This marking 13a coincides with the center of the carrier tube 1. The reflecting square or mirror 13 is inclined exactly at an angle of 45° with respect to the lengthwise axis X'—X' of the carrier tube 1. Sighting mechanism S further incorporates a sighting needle 14 the tip of which is directed perpendicular to the axis X'—X' of the carrier tube 1, and a sighting mirror 15 which by virtue of its inclination to the axis X'—X' of the carrier tube 1 permits sighting through the center of the aforesaid carrier tube 1 with the body of the user in a comfortable position.

(3) *The centering mechanism for controlling the geometric axis position.*—By referring to FIGURES 3 and 4 it will be seen that for such operation there is provided a centering mechanism G incorporating two vertical guide rods 16 and 17 which are rigidly yet easily detachably connected to both extension arms 4 and 5 respectively, by means of screws 18 and 19 respectively, and two respective pins, of which only both pins 17a associated with rod 17 are visible in FIGURE 3.

Connection of the apparatus with the chassis axle to be checked is carried out with the aid of two feelers for instance in the form of centering bolts or spindles 22 and 23 connected to adjustable slides 20 and 21 respectively, displaceably guided at the rods 16 and 17 respectively. The centering bolts 22 and 23 can be oppositely introduced at the centers of the axle after undertaking the required elevational positioning and fixing of the slides 20 and 21 along the guide rods 16 and 17 respectively, by means of the screws 24 and 25 respectively. During such introduction both sliding tubes 2 and 3 are displaced upon the carrier tube 1 to such a mutual extent until the tips of both centering bolts 22 and 23 are seated with slight pressure at the center of the axle.

(4) *The marking device provided with a marking cone.*—This auxiliary device M serves for marking the crossover point of the vehicle axis and the sighting line and comprises a preferably black dyed marking cone 26 and a rod 27 connected to this marking element or cone 26. A handgrip 28 is carried by the rod 27 opposite the marking element 26, as best seen by referring to FIGURE 3.

Now, FIGURES 10 and 11 depict the procedure which is carried out during control with the aid of the previously described apparatus for checking the rear axis position. During the first operation the carrier device C equipped with the centering bolts 22 and 23 and with a steering position corresponding to approximately "straight ahead driving" is connected to the front axle. Such is shown in FIGURE 10.

Due to the feature of the inventive control apparatus that the axis X'—X' of the carrier tube 1 after connection of the apparatus to the vehicle axis extends parallel to the latter and the sighting rays deflected by the reflector mirror 13 coincide with the plane of symmetry of the vehicle axis it is possible to mark at the floor by means of the marking cone 26 the vertical projection of the crossover point P of the forward axis and the sighting line. Marking is undertaken by sighting with the sighting mechanism 13, 14 and 15, and by positioning of the marking cone 26 in accordance with the sight picture or image. The sight picture is then correct if, as shown in FIGURE 5, the tip of the sighting needle appears as 14', the tip of the marking cone 26 as 26' and is located exactly at the vertical marking line 13a appearing as 13a' of the reflector mirror 13 appearing as 13', with the marking cone 26 located at the floor approximately in the line of the forward axis.

After marking the mentioned crossover point P between vehicle axis and sight line, which can be carried out quite quickly, the control apparatus is de-mounted from the forward axle and connected to the rear axle, in the manner shown in FIGURE 11. After having connected the apparatus there is sighted the tip of the marking cone 26 previously erected at the forward axle. If the position of the rear axis is correct then there must appear the already described sight picture of FIGURE 5. Even the smallest deviation during adjustment of the rear axis is visible in the sight picture of FIGURE 5 due to a corresponding lateral displacement of the marking cone 26. In this event, the position of the rear axis must be corrected such that there appears a faultless symmetrical sight picture, as already considered. The position of the forward axis is checked in the same manner as just-described.

(5) *Measuring head and indicator device for controlling the two-dimensional inclination of the plane of the wheels.*—Such physical structure, generally designated by reference character H, will best be understood by referring to FIGURES 6 and 7. In order to undertake this operation the carrier device C is equipped with two measuring heads 29 in lieu of the centering bolts 22, 23 and guide rods 16, 17. These measuring heads can be connected to the carrier device C in the same manner as the centering bolts 22 and 23 with guide rods 16 and 17 respectively. Measuring heads 29 are each provided with two measurement data-indicators to be considered in greater detail shortly. One measurement data-indicator at each measuring head 29 produces a test or measurement value corresponding to the wheel inclination ("camber") measured in a vertical plane, while the other of both measurement data-indicators produces a test or measurement value corresponding to wheel inclination ("toe" e.g. "toe-in") measured in horizontal plane.

In order to produce the measurement data or values a number of different possibilities are available, there coming under consideration inductive and ohmic measurement value-indicators. In so doing, evaluation and indication of the measurement results is preferably undertaken with a known bridge circuit connection.

In FIGURES 6, 7 and 15 there is shown a respective perspective view of an exemplary embodiment of measuring head generally designated by reference character 29, wherein FIGURE 15 further depicts details of the measuring disk 30 provided with the clamping mechanism and required for undertaking precise measurement; the specifics of which will be considered more fully shortly.

Each measuring head 29 essentially is composed of at least three feelers. In FIGURE 7 these feelers are depicted as lengthwise displaceable measuring pins 31, 32 and 33 which are pressed with slight pressure against the associated measuring disk 30 whereby the measuring pins 31, 32 and 33 assume different axial positions corresponding to the inclination of the aforesaid measuring disk 30. Since the inclination of the spatial main axes of the chassis (FIGURE 1 and FIGURE 2) must be appropriately registered and the chassis axis X—X is already determined as a basis by means of the carrier device C, in this instance there is measured the inclination of the wheel planes to the axis Y—Y, that is, the so-called "toe-in," and their inclination to the axis Z—Z, that is, the so-called "camber."

FIGURE 8 schematically illustrates in development view an exemplary arrangement of the measuring value-indicator means of a measuring head 29' for carrying out measurements by means of differential transformers. By referring to such figure it will be apparent that for the purpose of simplifying the apparatus a measuring pin 32 is selected as base for both measuring coordinates. For such reason, the measuring pin 32 carries for instance the measuring transformers 34 and 35, the respective magnetic cores 36 and 37 are connected with the measuring pins 31 and 33 respectively. Relative displacement between both measuring pins 31 and 32, corresponding to the distance designated by reference character $a$ (FIGURE 15), provides an inductive measurement value or data for the "camber," whereas in corresponding manner the relative displacement between both measuring pins 32 and 33, corresponding to the spacing designated by reference character $b$ of FIGURE 15, provides a measurement value for "toe." These measurement values in consideration of the necessary high exactness with inductive measurements are evaluated in a known frequency measuring bridge generally indicated at 38 (FIGURE 6) and provided with an indicator scale 38a and a number of push buttons 38b to be further considered in greater detail hereinafter. The measured values are appropriately indicated at the indicator scale with which cooperates an indicator needle 38c.

FIGURE 9 is a development view which likewise schematically illustrates an exemplary arrangement of the measurement value-indicator means for carrying out measurements by means of measuring potentiometers or ohmic-indicators. In this case, two contacts 39 and 40 insulated from the measuring feeler or pin 32 are carried by the latter, whereas a respective resistance means 41 and 42 is carried by the measuring pins 31 and 33 respectively. The relative axial displacement of the measuring pins 31, 32, 33 causes a proportional change in the resistance, which with this solution can also be advantageously evaluated and indicated by a known bridge circuit connection in the usual manner.

In order to be able to perform the necessary positioning of this carrier device C the measuring heads 29 must also exhibit a respective stationary feeler located symmetrically with respect to the sight line. Now, in order to be able to easily fulfil this requirement in a practical embodiment, the central measuring pin 32 during adjustment of the carrier device is pressed against a removable stop or impact member 43, as best shown in FIGURE 15. After completion of the adjustment and fixing of the carrier device C the stop member 43 is removed from the zone of movement of the measuring pin 32 by pivoting such stop member 43 about its axis 43a, and which will be more fully explained later during the description of the operation.

(6) *The measuring disk with the clamping mechanism.*—In order to be able to exactly scan the wheel plane with the aid of the measuring head 29 a measuring surface is required which extends exactly parallel to the plane of the wheel and which must be able to be provided without difficulty at the wheel. The apparatus depicted in FIGURE 15 serves exactly this purpose. A disk, specifically the already mentioned measuring disk 30 provided with the previously mentioned measuring surface, indicated at 30a in FIGURE 15, which disk preferably is formed of steel, hardened or hard-chromium plated and finely ground, is adjustably secured to a base piece for movement in two directions crossing one another at an angle of substantially 90°.

More specifically, by referring to FIGURES 15 and 16 it will be seen that the measuring disk 30 is secured to an appropriately constructed support or carrier 44 serving as the base piece which with the aid of two lateral arms 45 and 46 and connecting bolts 47 and 48 mounted to such arms 45 and 46 respectively, at the same time also forms two clamping points fitting to the rim of the wheel. The third clamping point is formed by a clamp lever 50 displaceable upon a rod-shaped arm 49 of the carrier 44 in accordance with the size of the wheel rim, which after adjustment to the profile of the wheel rim and tightening of a screw 51 with a tilting motion fixedly clamps the entire clamping mechanism to the wheel rim.

Attachment of the measuring disk 30 to the relevant carrier 44 takes place with the aid of an articulation or hinge point formed by a ball or sphere 52 seated in appropriate recesses 52a and 52b of the carrier 44 and the measuring disk 30 respectively. Two adjusting screws 53 and 54 possessing knurled heads 53a and 54a and tips 53b and 54b, respectively, projecting past the heads 53a and 54a respectively, form both of the adjustable bearing or support points for the measuring disk 30. Now, in order to fixedly hold the measuring disk 30 at these three support points there is provided a U-shaped spring 55 mounted to the measuring disk 30 which elastically pulls such measuring disk 30 towards the carrier 44 and thus ensures for positive bearing of the measuring disk 30 at the described three support points. The inclination of the measuring disk 30 during adjustment can be changed through the agency of the adjusting screws 53 and 54.

*Performance of angular measurement with the apparatus according to structural type "A" for measurement of the forward axis and the steering geometry*

In this connection FIGURES 12 and 13 depict the sequence of operations.

The first step entails mounting the measuring disks 30, which is effected by means of the previously described clamping mechanism or arrangement 44 to 55. After mounting such clamping mechanism 44 to 55 the wheels must be individually or collectively raised from the floor in order that they can be manually freely rotated completely around. Thereafter the measuring disks 30 must be aligned by adjusting the support screws 53 and 54 in such a manner that when they are turned together with the wheels they do not possess any wobble or side impact. Control of the side impact of the measuring disks 30 is carried out by advancing a feeler of the measuring head 29, the indicator needle 38c of the indicating apparatus 38 indicating fluctuations of the relevant measuring disk 30. When the indicator needle 38c is at rest during rotation of the wheel then such measuring disk 30 is exactly aligned.

It is further to be mentioned that for the repeated checking of a certain make of car generally special apparatuses can be provided which make it unnecessary to align the measuring disks 30, such as for example for "Volkswagens," because the point of attachment can be selected in such a manner that side impact or wobbling of the rim is not measured.

The next step during measurement is marking the center of the rear axis (FIGURE 12). Connection of the carrier device C to the rear axle takes place by means of the previously described apparatus for controlling the position of the axis, i.e. by means of the centering feeler bolts 22 and 23 (FIGURE 3). The control apparatus is connected to the rear axle and by sighting the marking cone 26 is then positioned beneath the rear axle. Thereafter the control apparatus is released from the rear axle; the centering bolts 22, 23 together with the associated guide rods 16 and 17 are detached from the carrier device and in place of these the measuring heads 29 are mounted to the apparatus (FIGURE 6).

After completion of this operation the control apparatus is displaced to the forward axle (FIGURE 13), thereafter the stop or impact means 43 (FIGURE 15) are rocked into their effectual position. By pushing both sliding tubes 2 and 3 towards one another the measuring heads 29 are pressed against their associated disks 30 to such an extent until the measuring pins 32 provided at their rear end with an impact surface 32a have reached the associated impact means 43. Care must be taken that all measuring pins 31, 32, 33 are located at the corresponding measuring surface 30a of the measuring disks 30. In this position the carrier device C during sighting is re-positioned or aligned to such an extent that the tip of the marking cone 26 appears exactly in the middle of the sight picture or field (FIGURE 5). In this position the carrier device C is fixed against displacement to the floor.

For fixedly securing the carrier device C there is contemplated providing two holding or arresting magnets 56 and 57 guided in both extension arms 4 and 5 and two associated holding plates 58 and 59 situated upon the floor (FIGURES 3 and 14). During fixation of the device both holding magnets 56 and 57 are raised by means of their liftable support arms 56a and 57a respectively, the holding plates 58 and 59 are placed therebeneath, and the holding magnets 56 and 57 again lowered thereon. The weight and the friction of the holding plates 58 and 59 upon the floor in conjunction with the action of the holding magnets 56 and 57 prevent displacement of the device along the floor during the measuring operation. In this phase the impact means 43 are rendered ineffectual by rocking thereof into the position of FIGURE 6 for instance. The indicator apparatus 38 is now advantageously placed upon the motor hood in such a manner that the person operating the control apparatus can simultaneously reach the steering wheel and the front of the indicator apparatus.

In the simplest construction of indicator apparatus 38 there is simultaneously only indicated a single measurement result, for instance "toe-in left" or "toe-in right" or "camber left" and so forth, for which reason in each case it is necessary to switch over from one measurement value to the other. Such switching-over operation is carried out by keys or push buttons 38b having appropriate markings and located at the indicator apparatus 38 (FIGURE 6). Since the physical structure of the indicator apparatus 38 does not constitute part of the present invention and, further, since indicator devices suitable for the purposes of the present invention and using for instance a bridge circuit connection are well known to the art, details thereof need not be considered.

Since the subsequent operation entails the exact symmetrical adjustment of the steering, there is first switched to "toe-in left," thereafter "toe-in right," and during such repeated switching both read-out values are balanced by appropriately moving the steering wheel. At this moment the steering position corresponds to "straight-ahead driving" position ("null-position"). The values of "toe-in" indicated at the scale 38a of the indicator apparatus 38 in millimeters are thus given by this adjustment. In order that no interpolation or correction is necessary in dependency of the relevant rim diameter the size of the rim is previously set at a preselector switch 38d (FIGURE 6) which by appropriate correction of the deflection or swing of the indicator needle 38c renders possible direct reading-out of the effective value.

After reading both "toe-in" values the measuring bridge is switched to "camber" measurements and the values for left and right are read-off. Measurement of the inclination of the axle spindle bolts results by a differential measurement. To this end, after deflection of the indicator 38c for instance the left front wheel is first adjusted to "null toe-in," thereafter there is switched-over to "camber measurement," by changing an element of the measuring bridge balanced to null indicator position "null," again switched to "toe-in," the front wheel placed at 5°-toe-in, then switched over to "camber" measurement and the indicated "camber" differences read-off. The same procedure is repeated for the right front wheel. Consequently, there is undertaken the complete measurement or checking of the front axis. If a correction of the setting is necessary then the indicator apparatus is located such that during corrective adjustment read-out is possible.

Measurement of the rear wheel by means of the apparatus constructed according to structural type "A" takes place in the same manner as for the front wheels, that is, after properly mounting the measuring disks 30 the center of the forward axis is initially marked, then the control apparatus is placed at the rear wheels, directed towards the center of the forward axis, whereafter the values of "toe-in" and "camber" are read-off in the manner previously described.

(B) *Structural type "B"—stationary control apparatus*

For larger service stations where the most important factor next to exactness of control and ease of carrying out such by its operating personnel, is as large a measuring capacity as possible, then a measuring station constructed according to structural type "B" which is stationary, provides considerable advantages.

For this physical structure shown in FIGURE 17 the embodiment of control apparatus is essentially analagous to the previously described structural type "A." The installed measuring heads 69, 70 and 71, 72 are symmetrically guided and infed in pairs, and measurement takes place by feeling or scanning the measuring disks mounted at the wheels. However, in this embodiment of the invention the operation is rendered quite simple in that the geometric connection between both vehicle axes and carrier tubes is effected by means of a right-angled or perpendicular mechanical connections, so that there is dispensed with the parallel alignment of the measuring apparatus.

Specifically, by referring to FIGURE 17 it will be appreciated that there is schematically illustrated an exemplary embodiment of stationary control apparatus. Such apparatus incorporates two carrier tubes 60 and 61 upon which there are guided lengthwise displaceable slide tubes 62, 63 and 64, 65 respectively. There is further provided a lengthwise adjustable cross-tie rod means 66 incorporating two telescopic interfitting and displaceable tubes 67 and 68, each of which are fixedly connected, for instance by welding, at a respective end to the carrier tubes 60 and 61. The carrier tube 60 is provided with two measuring heads 69 and 70 and the carrier tube 61 has associated therewith two measuring heads 71 and 72.

In this embodiment the control apparatus braces itself against the floor by means of caster rollers 73, 74, 75 and 76 mounted to extension arms 77, 78, 79 and 80 respectively. The latter are fixedly connected with the slide tubes 62, 63, 64 and 65 respectively corresponding to the embodiment of structural type "A" depicted in FIGURES 3 and 4.

In order that the control apparatus does not have to move a great deal at the illustrated inspection station a car ramp 81 is associated with such control apparatus and by means of which the vehicles can be quickly delivered and removed. If the control apparatus is used at a repair station then the apparatus is placed above the pit of such repair station in order that the checking or control work can be comfortably carried out.

After attaching and aligning the measuring disks the measuring heads are advanced or infed, the measuring apparatus is then fixed, whereafter the operator standing next to a control desk or cabinet 82 can carry out all of the desired measuring operations. This control desk 82 contains at least two indicating devices 83 and 84 and a series of push buttons 85 which are operably associated with the different checking operations.

The normal procedure for carrying out control with such apparatus is as follows:

(1) Symmetrically positioning the steering;
(2) Adjusting for the rim size;
(3) Reading out "toe-in" of the front wheels;
(4) Pressing the key "forward camber" and reading-out the values for camber;
(5) Pressing the key "toe-in rear" and reading-out the values;
(6) Pressing the key "camber-rear" and reading-out the values;
(7) Pressing the key "base" (corresponding to a toe-in reading) and adjusting for instance the left front wheel to "0" position;
(8) Pressing the key "balance" (corresponding to a camber reading) and adjusting the indicator at the left indicator device to "0" position;
(9) Pressing the key "drive-in" (corresponding to a toe-in reading) and turning the left front wheel until the indicator has completely deflected;
(10) Pressing the key "camber and pivot inclination (caster)" and reading-off the value.

Naturally, by installing more indicating devices it is possible for instance, to simultaneously indicate all measurement values for "camber" and "toe-in." However, as already mentioned, details of the physical structure of the indicating devices are not necessary for understanding the underlying principles of the invention, and known devices can be used which, if necessary, can be modified to comply with control requirements.

What is claimed is:

1. Control apparatus for checking the geometry of the chassis of a motor vehicle, said chassis including a central longitudinal axis, a forward vehicle axis and a rear vehicle axis defined by a linear connecting line between forward wheel centers and rear wheel centers respectively, said control apparatus comprising: at least a pair of feeler means adapted to be connected to said chassis adjacent at least one of said forward and rear axes and said respective wheels thereof; means for supporting said feeler means for forced movement mutually and synchronously towards and away from each other during operable connection of said feeler means with said chassis, whereby during said operable connection, the geometric relationship of said feeler means are comparable with the geometric relationship of said at least one of said forward and rear axes and said respective wheels thereof; said control apparatus including means for determining said central longitudinal axis of said chassis by the position of said forward and rear axes relative to each other; and means coupled with said feeler means for measuring said geometric relationship of said at least one of said forward and rear axes and said respective wheels thereof relative to said determined central longitudinal axis.

2. Control apparatus for checking the geometry of the chassis of a motor vehicle as defined in claim 1 further including an indicator apparatus coupled with said means for measuring, said indicator apparatus including a preselector switch for adjusting the measurement results so that they are indicated directly as effective values.

3. Control apparatus for checking the geometry of the chassis of a motor vehicle as defined in claim 1 further including holding magnets cooperating with said carrier device to fixedly hold the latter at a support surface.

4. Control apparatus for checking the geometry of the chassis of a motor vehicle as defined in claim 1 wherein said supporting means for said feeler means is constructed to render said control apparatus transportable, said means for measuring including a sighting mechanism.

5. Control apparatus for checking the geometry of the chassis of a motor vehicle as defined in claim 1 wherein said feeler means and said carrier device comprise centering mechanisms elevationally displaceable with respect to one another for determining the center of the relevant vehicle axis.

6. Control apparatus for checking the geometry of the chassis of a motor vehicle as defined in claim 1 further including means for enabling movement of said feeler means and said carrier device in a horizontal plane with respect to the motor vehicle yet freely movable within such plane.

7. Control apparatus for checking the geometry of the chassis of a motor vehicle as defined in claim 6 wherein said feeler means and said carrier device during operable connection with said chassis are displaceable in said horizontal plane and can be thus aligned in accordance with the pregiven position of the chassis.

8. Control apparatus for checking the geometry of the chassis of a motor vehicle as defined in claim 1 further including mechanical measuring surface means capable of being mounted to the wheels of the motor vehicle for measuring wheel inclination relative to said central longitudinal axis of said chassis, said measuring surface means incorporating means for adjusting said measuring surface means at substantially right-angles with respect to the relevant wheel axle, said feeler means scanning said measuring surface means.

9. Control apparatus for checking the geometry of the chassis of a motor vehicle as defined in claim 8, wherein said means coupled with said feeler means for measuring said geometric relationship of said at least one of said forward and rearward axes and said respective wheels thereof include electrical measurement indicator means for scanning said measuring surface means.

10. Control apparatus for checking the geometry of the chassis of a motor vehicle as defined in claim 1, wherein said means for supporting said feeler means comprises a carrier device for displaceably mounting said feeler means.

11. Control apparatus for checking the geometry of the chassis of a motor vehicle according to claim 2 wherein said carrier device comprises a carrier tube, a respective slide tube slidably mounted at each end of said carrier tube, and means cooperating with both slide tubes for forcibly simultaneously mutually moving both slide tubes through the same displacement paths.

12. Control apparatus as defined in claim 11 including a carrier device and a pair of feeler means provided for each geometrical forward and rear vehicle axis, and means for operatively mechanically interconnecting both carrier devices.

13. Control apparatus as defined in claim 11 further including a sighting mechanism cooperating with said carrier device.

14. Control apparatus as defined in claim 13 wherein said feeler means incorporate centering bolts.

15. Control apparatus as defined in claim 13 wherein said feeler means incorporate displaceable feeler pins for determining individual wheel inclination.

References Cited

UNITED STATES PATENTS

| | | | |
|---|---|---|---|
| 2,164,853 | 7/1939 | Beckwith | 3—203.15 |
| 2,401,715 | 6/1946 | Wilkerson | 33—203.17 |
| 2,497,481 | 2/1950 | Weber | 33—203.2 |
| 2,552,178 | 5/1951 | James | 33—203.2 |
| 2,630,881 | 7/1952 | Holaday | 33—203.15 |
| 2,882,607 | 4/1959 | Binder | 33—203 |
| 2,972,189 | 2/1961 | Holub | 33—203.2 |
| 3,128,561 | 4/1964 | Payne | 33—203.2 |
| 3,162,950 | 12/1964 | Hykes | 33—193 X |
| 3,307,263 | 3/1967 | Castiglia et al. | 33—203.18 X |

WILLIAM D. MARTIN, JR., *Primary Examiner.*

U.S. Cl. X.R.

33—193, 203.2